(12) United States Patent  
Weber et al.

(10) Patent No.: US 8,082,355 B1  
(45) Date of Patent: Dec. 20, 2011

(54) INTERNET MULTIMEDIA ADVERTISEMENT INSERTION ARCHITECTURE

(75) Inventors: Barry Jay Weber, Carmel, IN (US); Kerry Wayne Calvert, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2276 days.

(21) Appl. No.: 09/712,887

(22) Filed: Nov. 15, 2000

Related U.S. Application Data

(60) Provisional application No. 60/207,385, filed on May 26, 2000.

(51) Int. Cl.  
    G06F 15/16 (2006.01)

(52) U.S. Cl. ........ 709/231; 709/201; 709/218; 709/225; 725/25; 725/32; 726/4

(58) Field of Classification Search .................. 709/231, 709/201, 225, 229, 218; 713/202; 725/25, 725/32; 726/4  
See application file for complete search history.

(56) References Cited

U.S. PATENT DOCUMENTS

| | | | |
|---|---|---|---|
| 5,649,013 A | 7/1997 | Stuckey et al. | 380/4 |
| 5,734,589 A * | 3/1998 | Kostreski et al. | 715/716 |
| 5,778,187 A * | 7/1998 | Monteiro et al. | 709/231 |
| 5,878,219 A | 3/1999 | Vance, Jr. et al. | 395/200.47 |
| 5,924,090 A | 7/1999 | Krellenstein | 707/5 |
| 5,933,811 A | 8/1999 | Angles et al. | 705/14 |
| 5,951,646 A | 9/1999 | Brandon | 709/231 |
| 6,006,257 A | 12/1999 | Slezak | 709/219 |
| 6,006,265 A * | 12/1999 | Rangan et al. | 709/226 |
| 6,009,413 A | 12/1999 | Webber et al. | 705/26 |
| 6,012,051 A | 1/2000 | Sammon, Jr. et al. | 706/52 |
| 6,018,768 A * | 1/2000 | Ullman et al. | 709/218 |
| 6,026,429 A | 2/2000 | Jones et al. | 709/201 |
| 6,065,047 A | 5/2000 | Carpenter et al. | 709/218 |
| 6,067,562 A | 5/2000 | Goldman | 709/206 |
| 6,085,229 A * | 7/2000 | Newman et al. | 709/203 |
| 6,112,192 A * | 8/2000 | Capek | 705/59 |
| 6,205,480 B1 * | 3/2001 | Broadhurst et al. | 709/225 |
| 6,349,329 B1 * | 2/2002 | Mackintosh et al. | 709/219 |
| 6,411,992 B1 * | 6/2002 | Srinivasan et al. | 709/218 |
| 6,434,621 B1 * | 8/2002 | Pezzillo et al. | 709/231 |
| 6,498,897 B1 * | 12/2002 | Nelson et al. | 386/125 |
| 6,505,240 B1 * | 1/2003 | Blumenau | 709/218 |
| 6,678,215 B1 * | 1/2004 | Treyz et al. | 368/10 |
| 2001/0023436 A1 * | 9/2001 | Srinivasan et al. | 709/219 |
| 2002/0038383 A1 * | 3/2002 | Ullman et al. | 709/245 |

FOREIGN PATENT DOCUMENTS

EP 0984584 A1 3/2000

(Continued)

*Primary Examiner* — David Lazaro  
(74) *Attorney, Agent, or Firm* — Robert D. Shedd; Vincent E. Duffy; Joel M. Fogelson

(57) ABSTRACT

An architecture for inserting listener targeted advertisements into Internet retransmission of terrestrial radio broadcasts is provided. An Internet server provides aggregation of a plurality of radio broadcast programming for dissemination over the Internet to a plurality of listeners/users. Each Internet provided radio broadcast includes advertisements targeted for each individual listener/user based on a demographics profile. The demographics profile for each listener/user provides a basis for the targeted advertisements. A readily scaleable architecture is capable of supporting rapid growth in listeners/users. Scheduling data is used to predict and pre-stage advertising content. Timestamping of the radio broadcast aids in calculating where in the broadcast data sequence to pick up after an advertisement. Scalability is preferably achieved by a multiplexer in order to support large numbers of listener connections for streaming audio.

14 Claims, 5 Drawing Sheets

FOREIGN PATENT DOCUMENTS

| | | |
|---|---|---|
| WO | WO 00/69163 | 11/2000 |
| WO | WO 01/24421 | 4/2001 |
| WO | WO 01/50368 | 7/2001 |
| WO | WO 01/50653 | 7/2001 |

* cited by examiner

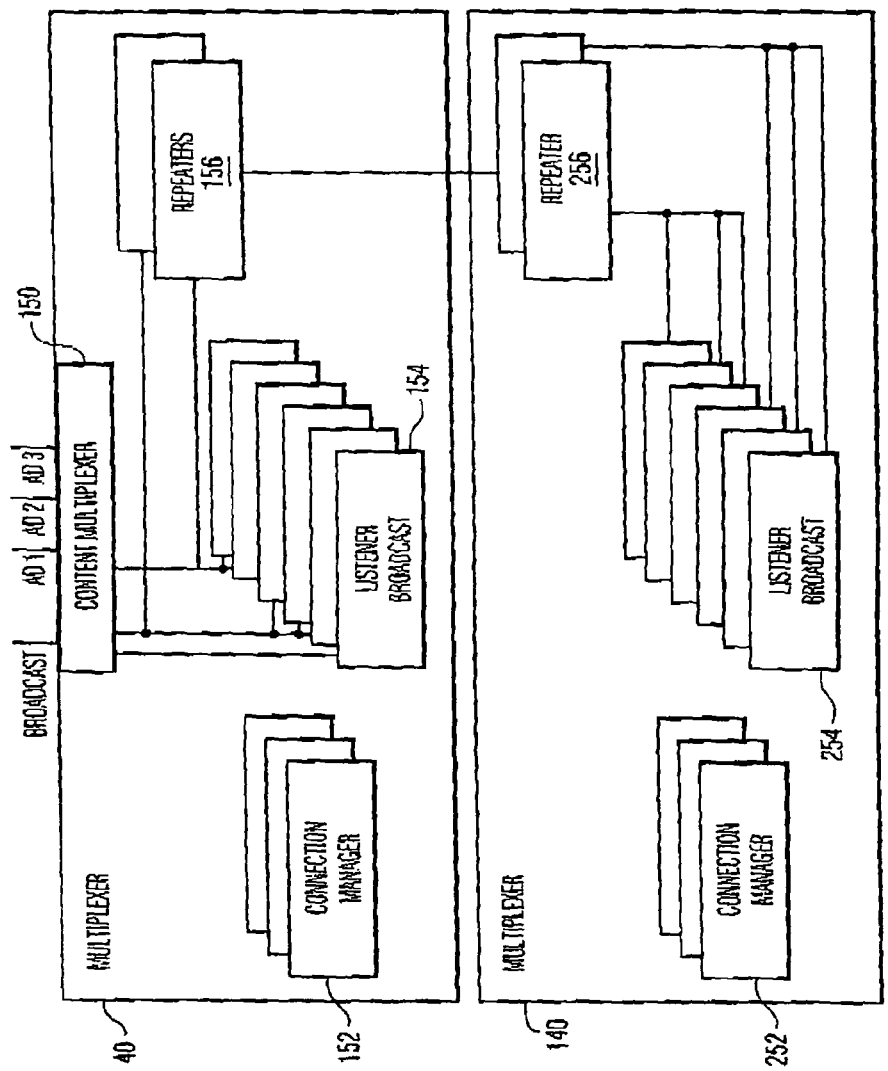

| ITEM | LENGTH | VALUE | REMARKS |
|---|---|---|---|
| MARKER | 4 | LOGN | MARKS START OF LOGIN REQUEST |
| BROADCASTER ID | 5 | | CALL LETTER ID OF STATION |
| VALIDATION | 32 | ENCRYPTED | ENCRYPTED VALUE THAT MUST DECODE AS VALID FOR THE CURRENT DATE/TIME, BROADCASTER ID, BROADCASTER PASSWORD |
| MARKER | 4 | ELOG | |

FIG. 4

| ITEM | LENGTH | VALUE | REMARKS |
|---|---|---|---|
| MARKER | 4 | LOGN | MARKS START OF LOGIN REQUEST |
| BROADCASTER ID | 5 | | CALL LETTER ID OF STATION |
| VALIDATION | 32 | ENCRYPTED | ENCRYPTED VALUE THAT MUST DECODE AS VALID FOR THE CURRENT DATE/TIME, BROADCASTER ID, BROADCASTER PASSWORD |
| MARKER | 4 | ELOG | |

FIG. 5

INTERNET MULTIMEDIA ADVERTISEMENT INSERTION ARCHITECTURE

This application claims the benefit of U.S. provisional patent application Ser. No. 60/207,385 filed on May 26, 2000 entitled "Internet Radio Ad Insertion Architecture".

FIELD OF THE INVENTION

The present invention relates to the transmission of broadcast content over the Internet and, more particularly, to an architecture for transmission of broadcast content over the Internet including the insertion of listener targeted advertisements.

BACKGROUND OF THE INVENTION

With standard radio broadcast over AM/FM frequencies, the target audience is essentially determined by the program format and the geographic coverage of the radio station. Radio broadcasters typically determine the numbers and demographics of their listener base by using statistical sampling techniques that are collected by a third party organization. These statistics are referred to as the Arbitron ratings. These ratings are crucial to the setting of advertising fees for the radio station, and are a major decision making tool for advertisers in determining where and how to place their advertisements.

However, advertisers prefer to direct their message to highly targeted listeners to increase the chance that the listener will act on the advertising message. With the Arbitron rating system, it is very difficult for an advertiser to judge the effectiveness of their campaign. This is because the advertiser and/or radio station simply cannot determined how many and what kind of people hear the advertising message with very much accuracy.

Some radio stations now simulcast their programming via the Internet (i.e. Internet radio) either directly from their own web site, or through an intermediary such as Yahoo!™ or another third party provider. Although the Internet medium has the inherent ability to provide information about the listener back to the broadcaster, to date there is no implementation(s) that take advantage of the Internet medium in this manner.

An advantage to the broadcaster and its advertising clients to using the Internet as a broadcast medium is that the programming can reach people who are in front of a computer rather than the radio, such as people who are at work, who would otherwise not be listening to the radio. The Internet medium also allows people who are out of range of a particular conventional over-the-air broadcast signal, to be able to listen to the broadcast programming.

A current disadvantage in utilizing the Internet as a distribution vehicle is that the advertising content may be completely out of context to a listener. This may occur when the listener is out of range of the over-the-air (i.e. AM/FM) broadcast signal. A person in New York, for example, listening to an Internet broadcast of a Houston radio station program, will not likely have an interest in advertising focused on the Houston location of the broadcaster. Hence the value of increasing listenership via the Internet does not have the same financial benefit as increased listenership within the AM/FM broadcast range.

The above discussion is also applicable to any type of originally broadcast multimedia programming that is being provided over the Internet, concurrently or not.

Thus, there is a need for providing Internet multimedia content that contains advertisements for a particular listener.

As well, there is a need to provide Internet multimedia content simultaneously to a plurality of listeners.

Additionally, there is a need to offer and provide a plurality of stations of multimedia content via the Internet simultaneously to a plurality of users.

SUMMARY OF THE INVENTION

The present invention is a system for processing and/or providing broadcast multimedia content and targeted advertisements to multiple different users over a network.

The present invention provides the capability to connect a selected audience to an advertisement such that different people listening to and/or viewing the same broadcast program will hear unique advertisements. The invention also allows for the exact determination of how many listeners are tuned in, and can identify the demographics of the listener based on available information. This information provides the advertiser and radio broadcaster with a much greater information base upon which to make decisions that are key to their operations and product offerings.

The present invention is particularly well suited for playback devices that do not have internal disk storage (such as radios, cell phones, etc). However, the present invention still works with personal computers (computers) and those devices that offer disk enabled playback systems.

BRIEF DESCRIPTION OF THE DRAWINGS

Reference to the following description of the present invention should be taken in conjunction with the accompanying drawings, wherein:

FIG. 3 is a block diagram of the functionality of the multiplexer of FIG. 2 in accordance with the principles of the present invention;

FIG. 4 is a table showing login commands that a broadcaster sends to an aggregator program in order to forward program content for broadcast over the Internet in accordance the present invention;

FIG. 5 is a table showing login commands that a broadcaster sends to the aggregator program in order to forward advertisement mapping data in accordance with the present invention.

Corresponding reference characters indicate corresponding parts throughout the several views.

DETAILED DESCRIPTION OF THE INVENTION

Figure 1:
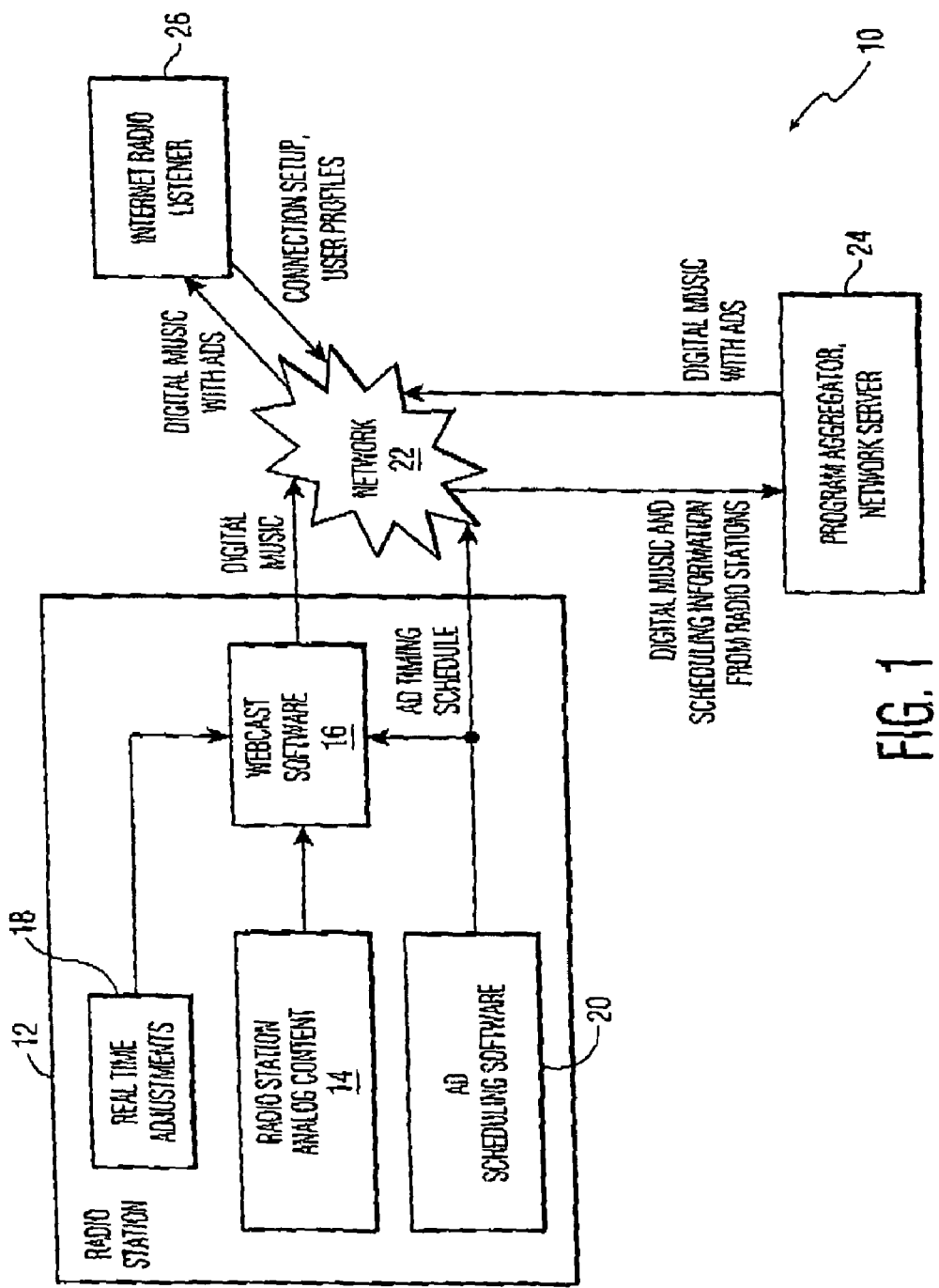
FIG. 1 is a block diagram of an Internet radio application illustrating one form of a multimedia broadcast.

With reference to FIG. 1, there is depicted a block diagram representation, generally designated 10, of a broadcast radio station network implementation and, more particularly, an Internet radio implementation of a broadcast radio station in accordance with the principles presented herein. It should therefore be initially understood that the broadcast radio station network implementation shown in the figures and described herein is only representative of a broadcast multimedia system or facility. As such, the principles presented herein with respect to broadcast radio (audio content, data, or programming) also applies to other broadcast multimedia. Other broadcast multimedia includes, but is not limited to, streamed audio data, streamed video data, voice representative data, voicemail data, and video broadcast.

A radio station 12 produces or generates analog programming or content 14. The analog content 14 is in an audio analog format and is broadcast or transmitted over the air (i.e. terrestrial broadcasting) in an AM or FM format such as is known in the art. The radio station 12 may broadcast its content in digital form, but is typically in analog form. Terrestrial broadcasting of the radio station analog content 14 is received by standard radio receivers within the broadcast reception area as is known in the art. The radio station analog audio content (hereinafter "radio content") 14 contains programming (i.e. music and talk) interspersed with advertisements. The content of the advertisements is targeted for the listeners in the broadcast reception area.

Analogous to a radio station performing radio broadcasting, a television station produces or generates video and audio programming or content (i.e. television content). The content may be in an analog and/or digital format and is broadcast over the air (i.e. terrestrial broadcasting) in a format such as is known in the art. Such terrestrial broadcasting of the television content is received by television receivers within the broadcast reception area as is known in the art. The television station television content contains programming (i.e. video and audio) interspersed with advertisements. The content of the advertisements is targeted for the listeners in the broadcast reception area. Other forms of multimedia content may be broadcast in the same manner.

In addition to over the air broadcasting of the radio station analog content 14, the radio station 12 may provide the radio content 14 over a network 22. The network 22 is typically an electronic network and, more particularly, is typically the Internet. However, it should be appreciated that the present invention is applicable to any type of network or network system. In preparing the radio content 14 for dissemination over the network 22, the radio content 14 is appropriately formatted, as indicated by module 16. This may be accomplished via software such as WebCast™ software. Formatting 16 of the radio content 14 includes converting the analog signal into a digital signal for transmission to and via the network 22.

The radio station 12 also must provide a schedule of advertisements, module 20, for the radio content. This may be accomplished by advertising scheduling software. The advertisement scheduling software provides scheduling information or data to the formatting of the analog signal as well as providing an advertisement timing schedule (advertisement mapping data) for additional dissemination over the network 22. The scheduling information is converted into markers or data that is contained within or formatted into the formatted analog signal in order to indicate when an advertisement should be inserted. The advertisement mapping data provides information regarding length of time (duration) for the advertisement, timing scheduling, and the like. Real time adjustments 18 are also provided to the formatting 16 of the analog signal if necessary, since delays may occur between the live broadcasting and the formatting/transmission of the analog signal for dissemination over the network 22.

After formatting 16 of the radio content 14, the now digital radio content is provided to the network 22. It should be additionally appreciated that the radio station 12 is representative of one of a plurality of radio stations that provide their over the air broadcast radio content to the network 22. The digital radio content and advertisement scheduling data from all of the contributing radio stations 12 is collected by a network server 24 that is in communication with the network 22. The network server 24 aggregates the radio content and advertisement scheduling data for dissemination over the network 22 to multiple listeners. Thus, the network server 24 becomes a provider of radio content of a variety of radio stations situated anywhere to anyone that has access to the network 22 and has the appropriate software.

A user or listener 26 accesses the network 22 via appropriate means (such as via a browser on a personal computer with a modem) and contacts and connects to the network server 24. The listener 26 selects a radio station/audio broadcast from a plurality of radio stations offered by the server 24. The network server 24 then provides the listener 26 the chosen radio station audio broadcast in real time via the network 22. The network enabled device of the listener 26 also has appropriate software to play (decode) the audio format of the audio broadcast from the network server 24.

In accordance with an aspect of the present invention, the audio broadcast from the network server 24 includes advertisements that are targeted to the particular listener. The targeted advertisements are inserted in place of or where the advertisements would be in the original radio station broadcast. Thus, instead of hearing advertisements targeted to the listening audience of the place of origin of the radio station, the listener 26 hears advertisements that are specific or targeted to the particular listener. The advertisement timing schedule from the advertisement scheduling software 20 of the radio station 12 and timing information coded into the formatted radio content allow the network server 24 to accurately place targeted advertisements into the audio broadcast of the network server 24. The targeted advertisements are obtained by the server 24. In order to be able to provide the targeted advertisements, it is necessary to obtain demographic information on the listener and reference the demographic information during the appropriate times of the audio transmission. As well, in accordance with an aspect of the present invention, the network server 24 is operable to provide each one of a plurality of listeners any one of the plurality of radio stations carried by the network server 24 as well as provide targeted advertisements in each radio station broadcast to each listener. These radio program streams are seamlessly provided to each user.

Figure 2:
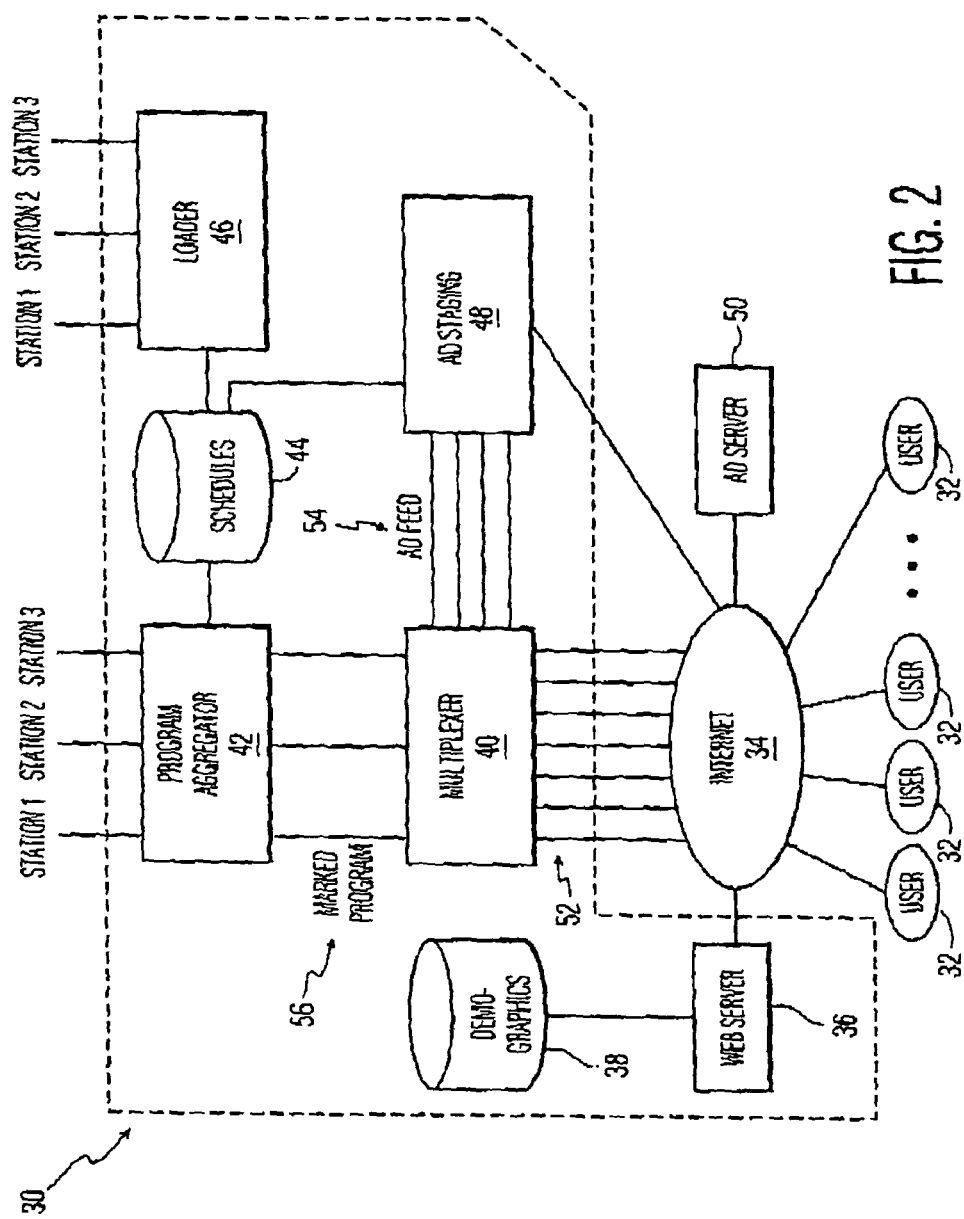
FIG. 2 is a block diagram the Internet radio application of FIG. 1 configured in accordance with the principles of the present invention.

Referring now to FIG. 2, a more detailed embodiment of the present invention is shown, generally designated 30. The system 30 is operable to provide any one of a plurality of multimedia feeds, content, programming, bitstreams, or the like to any one of a plurality of listeners or users 32. However, the system 30 will be described with respect to only one user 32 unless specifically indicated otherwise. While not specifically shown, it should be understood that the user 32 has and utilizes an Internet (network) enabled device that is operable to allow connection to and communication with the Internet 34. Consistent with the above, it should be appreciated that the term Internet encompasses any network system. Thus, an Internet enabled device is one that is compatible with the type of network in which the system 30 is used. Hereinafter, the term Internet will be used to denote any such network unless specifically indicated otherwise. The Internet enabled device may be a typical computer, such as a personal computer, a DSS system or the like (hereinafter, collectively "computer") having appropriate processing, memory, storage, logic or circuitry, and the like to access or connect to the Internet and contact and interface with the various servers in communication with the Internet. The Internet enabled device further includes appropriate software such as a browser program or the like. In addition to the browser program, the Internet enabled device includes appropriate software or other means to receive, decode and play the audio (radio station) broadcast such as is known in the art.

The user 32 accesses the Internet 34 and thereafter connects with the radio station provider web server 36 (hereinafter "web server 36"). The user 32 interacts with the web server 36 to preferably set up a subscription account which includes the collection of demographics regarding the user 32. The web server 36 thus has appropriate software to obtain demographic information/data from the user 32. Preferably, such user demographics are then stored on the user's Internet enabled device for permanent storage, and then cached in a demographics database (storage device) 38 associated with the web server 36 when the user 32 is connected to the web server 36. The subscription account, however, is not necessary for the operation of the present invention, but may offer the user 32 additional benefits.

In accordance with an aspect of the present invention, a web (Internet) agent program is installed on the Internet enabled device of the user 32. The web agent program may be downloaded from the web server 36 or other server, or provided on disk to the user 32 to install on the Internet enabled device. The web agent program is operable to track web sites visited by the user 36 when the user 36 is not listening to a radio broadcast from the web server 36. Web site information is used to supplement or populate the user's demographics. Internet enabled devices that may not accept a web agent or those that do not have storage capabilities may still connect to the web server 36 and listen to a radio broadcast. In these cases, user demographics is stored at the web server 36 such as in the demographics database 38.

When the user 32 connects to the web server 36 and selects or tunes to a particular radio station/broadcast, the user 32 is then connected to a multiplexer 40 through the Internet 34 via an IP socket connection or pipeline from the multiplexer 40. The multiplexer 40 is associated with either the web server 36 or another web server, and forwards the radio program contents from the selected radio station to the user 32. When advertisement data markers in the radio program content indicates that it is time for an advertisement to be inserted, the multiplexer 40 selects an advertisement channel or feed from a plurality of ad feeds 54 from an advertisement staging module 48 based on the demographic profile of the user 32, and connects the input source (i.e. radio program contents) to the appropriate advertisement channel.

In general, advertisement data markers are inserted by either the radio station 12 (i.e. the broadcast source) or the advertisement source and indicate when an advertisement is scheduled to be inserted into the program content as discussed above with reference to FIG. 1. This typically coincides with the advertisement schedule for the broadcast program content. Advertisement data as discussed above with reference to FIG. 1 is separately received by a loader 46 and added to the program content by a program aggregator 42.

The multiplexer 40 is operable to track the user connection and keep statistics in an advertising tracking database associated therewith. The statistics may include various information such as how many users hear a particular advertisement. This statistical information is made available to the broadcasters dynamically through a web portal to assist the broadcaster and their clients in analyzing advertisement performance interactively. Interactive and time classified analysis of the listener base is highly valuable to both the broadcaster and the advertiser. For example, if programming schedule assumptions regarding the type of listener were proving to be sub-optimal, the system supports dynamic reconfiguration of the schedule and advertisement content. Ongoing analysis of listener trends allows the broadcaster to fine tune their programming content to fit their audience, and advertisers to align their messages as well. Thus, the system 30 is operable to dynamically reallocate advertisements targeted to a user 32 in response to the acquired statistics.

It is a benefit of the present invention that the advertisement is thus customized for a specific user 32. It should be appreciated that it is important for the present invention to support large numbers of connected users without degrading the continuity of the stream of data (radio program content and advertisements) to the user 32, otherwise the sound will be choppy and broken. This may translate to loss of listener attention or a complete loss of listener interest. Thus, staging of the program data, listener demographic caching, and the preparation of the advertising streams to support efficient interconnection to the multiplexer 40 is a key feature of the present invention. The advertisements may be locally sourced or non-locally sourced. Locally sourced advertisements are preferable over non-locally sourced advertisements. Further, the user profile database for demographics 38, preferably in conjunction with the statistics acquired by the multiplexer 40, is operable to allocate the different advertisements for delivery to the user 32 based on previously compiled user preference data. As well, prior preference data based on a user program selection history may be used.

The various radio stations (program content), designated by Station 1, Station 2, and Station 3 in FIG. 2, are received by a program aggregator 42. The Stations 1-3 are representative of the plurality of radio stations that forward their programming content for dissemination over the Internet 34. The program aggregator 42 may be associated with the web server 36, another web server associated with the multiplexer 40, or still another web server. Additionally, as indicated above with reference to FIG. 1, the programming content from the various radio stations, depicted as lines designated Stations 1-3, is provided to the program aggregator 42 typically via the Internet 34. This is not explicitly shown in FIG. 2 for simplicity, and since the programming content may be provided to the program aggregator by other means.

Data, as to advertising scheduling for the programming content from each of the stations providing programming content, depicted as lines designated Stations 1-3, is provided to a loader 46. Advertising schedule data may be received from a broadcast source of the radio content (e.g. radio station 12) or by a source of a designated advertisement (i.e. a targeted advertisement chosen for insertion into the radio content bitstream). The scheduling data may cover multiple radio station content and multimedia types. Further, the scheduling data preferably includes at least the following information: information indicating time slots available for advertisement insertion in the broadcast program; markers in the selected broadcast program indicating an advertisement insertion time slot; and information identifying advertisement insertion time slots from time stamp indications. Other scheduling data may be provided. Such advertising schedule data includes information as to when advertisements are scheduled in the program content (timing), the length of time for the advertisement, and any other pertinent advertisement data. The advertisement data is forwarded to a schedule database 44 (scheduler) that is in communication with the program aggregator 42. The program aggregator 42 then generates marked programming content that is forwarded to the multiplexer 40. The marked programming content includes the programming content from the radio station along with the advertisement data that allows the multiplexer 40 to determine when it is necessary to insert an advertisement.

When it is determined that an advertisement is to be inserted into the programming content/datastream provided to the user 32, the multiplexer 40 selects advertisement content via one of the plurality of ad feeds 54 according to the demographics information in the demographics database 38, the computer of the user 32, or a combination thereof. Each ad feed 54 originates at an advertisement staging module 48. The advertisement staging module 48 collects advertisements for sending to the multiplexer 40 via the ad feed lines 54. Collection of advertisements may be accomplished via the Internet 34 where an advertisement may be stored on an advertisement server 50 in communication with the Internet 34. Other means of providing an advertisement to the ad staging module 48 may be used such as via a tape. The advertisement staging module 48 may thus store various advertisements obtained in any manner as via the Internet 34 or in real time from the advertisement server 50. The advertisement staging module 48 is thus operable to provide a plurality of advertisements to the multiplexer 40 to support targeted advertisement placement into the appropriate programming content.

The multiplexer 40 thus forwards the appropriate radio station/programming content to the user, and when data markers in the programming content as received from the program aggregator 42 via one of the marked program lines 56, indicate that it is time for an advertisement insert, the multiplexer 40 selects an ad feed 54 based on the demographic profile of the user 32 and connects the user's input source to the appropriate advertisement feed. Because the present invention supports a plurality of users all connected to the multiplexer 40 with each pipeline of programming content allowing for the insertion of targeted advertisements, regardless of whether pipelines contain the same programming content, it is necessary for the multiplexer 40 to support the plurality of pipelines of programming content and the insertion of targeted advertisements in each of the pipelines. In accordance with an aspect of the present invention, the program aggregator 42, the schedule loader 46, advertisement stager 48, and the multiplexer 40 all act in concert to provide each user 32 with an individual listening experience. Each of these sections or modules will be described further below.

The program aggregator 42 is preferably a multi-threaded software program that provides a connection with each radio broadcaster system and thus receives respective radio broadcast programming from each of the radio broadcast systems. It should be appreciated that each radio broadcast program is provided in more or less real time to the program aggregator 42.

The program aggregator 42 is implemented as a login thread, a control thread, and a read thread and may be considered a condition access processor. The login thread provides a connection from the radio broadcaster to the program aggregator 42. The connection is preferably made over a secure IP link. The login thread listens for requests from the broadcaster. When the connection is made, the login thread expects to receive a login request record. The login request record is analyzed to ensure that the client connection request is actually a permissioned radio station. It is preferable that the IP link from the radio broadcaster to the program aggregator 42 is secure and encrypted such that radio piracy is avoided. Upon successful login, the login thread starts a read, writer, and control threads, informing them of the identification (ID) of the broadcaster that has been connected.

FIG. 4 is a table, generally designated 60, showing one embodiment of login commands as sent by the radio broadcaster to the program aggregator 42 regarding the program content. Column 62 of the table 60 lists the login command items. Column 64 of the table 60 lists the login command bit length for the corresponding login command item from the login command item column 62. Column 66 of the table 60 lists the login value for the corresponding login item from the login command item column 62. Column 68 of the table 60 depicts remarks for the corresponding item from the login command item column 62. Row 70 of the table 60 shows that the item marker sent by the radio broadcaster, of bit length 4 and of a value LOGN, and received by the program aggregator 42 marks the start of a login request. Row 72 of the table 60 shows that the item broadcaster ID sent by the radio broadcaster; of bit length 5, and received by the program aggregator 42, presents the call letters identification of the particular radio station. Row 74 of the table 60 shows that the item validation, sent by the radio station, of bit length 32 and encrypted in accordance with an encryption routine, and received by the program aggregator 42, presents an encrypted value to the program aggregator 42 that must decode as valid for the current date/time, broadcaster ID, and broadcaster password. Lastly, row 76 of the table 60 shows that the item marker, sent by the radio broadcaster, of bit length 4 and a value of ELOG, and received by the program aggregator 42 stops receipt of the radio broadcast.

The control thread portion or module of the program aggregator 42 reads the schedule database 44 to determine the times that advertisement inserts are to take place in the broadcast program. A request to stage an advertisement for the next advertisement cycle is sent to the advertisement staging module or program 48. This request consists of a record that identifies each advertisement from the schedule that is required. The advertisement staging program/module 48 responds with a set of connection ports (ad feeds) that are available to read the advertisement content. The ports are then correlated to the demographic type by the control thread so that when it is time to start the advertisement, the core intelligence for associating a user 32 to an advertisement type is established.

A feature of the control thread is that the control thread ensures that all resources are classified and ready for use at the time that the advertisement is supposed/scheduled to run. Timing latency of finding the advertisement, staging the advertisement into memory, and allocating connection resources cannot be delayed to the time of need without interrupting the steady flow of music data (i.e. program content) to the user 32. The control thread will prepare a buffer that contains the mapping of a demographic advertisement to an advertisement stager port (ad feed) that is used by the multiplexer 40 to select advertisement content for a particular user 32. This buffer is transmitted to the read thread, which will place this thread in the multiplexer destined buffer stream when the start time arrives.

The read thread receives a data stream from the radio broadcaster, selecting valid encoded (such as by MP3 or the like) frames from the data and placing the valid frames in a memory queue that is then routed to the multiplexer 40. Each buffer of encoded frames is timestamped to mark its receipt from the broadcaster. The read thread stages the data received in memory to ensure the smooth flow of the data to the user 32. As well, the encoded frames are analyzed for integrity. Any bad frames are discarded to avoid sound degradation, typically caused by corrupted data. The read thread also reads a message buffer that contains the demographic ad/port mapping and determines the appropriate time to insert this message buffer in the multiplexer bound memory queue. The receipt of the message buffer by the multiplexer 40 is the signal to switch to advertising content instead of the broadcast data.

The programming schedule loader 46 receives programming schedule data from the radio broadcaster via a secure IP link connection. The schedule loader program opens a socket/pipeline (such as a TCP/IP socket) on a specific port id that has been assigned for a particular broadcaster. The schedule loader program runs continuously, servicing requests as they arrive. Upon receiving a connection request from the radio broadcaster, the loader 46 used the encrypted login protocol to validate the radio broadcaster, then processes requests from the radio broadcaster if validation succeeds. The requests consist of insert, update, and delete requests of scheduling records that are used to control the advertisement insertion into the program stream. The request is processed and the command record is then marked with the status of the operation, and the identifier of the record (when the command is an insert request). Thereafter, the command record is sent back to the radio broadcaster.

FIG. 5 is a table, generally designated 80, showing one embodiment of login commands as sent by the radio broadcaster to the loader 46 regarding advertisement mapping data. Column 82 of the table 80 lists the login command items. Column 84 of the table 80 lists the login command bit length for the corresponding login command item from the login command item column 82. Column 86 of the table 80 lists the login value for the corresponding login item from the login command item column 82. Column 88 of the table 80 depicts remarks for the corresponding item from the login command item column 82. Row 90 of the table 80 shows that the item marker sent by the radio broadcaster, of bit length 4 and of a value LOGN, and received by the loader 46 marks the start of a login request. Row 92 of the table 80 shows that the item broadcaster ID sent by the radio broadcaster, of bit length 5, and received by the loader 46, presents the call letters identification of the particular radio station. Row 94 of the table 80 shows that the item validation, sent by the radio station, of bit length 32 and encrypted in accordance with an encryption routine, and received by the loader 46, presents an encrypted value to the loader 46 that must decode as valid for the current date/time, broadcaster ID, and broadcaster password. Lastly, row 96 of the table 80 shows that the item marker, sent by the radio broadcaster, of bit length 4 and a value of ELOG, and received by the loader 46 stops receipt of the advertisement mapping data.

Figure 6:
FIG. 6 is a table showing record maintenance commands that the broadcaster sends to the loader program regarding the forwarding of records of mapping data in accordance with the present invention.

FIG. 6 is a table generally designated 100, showing one embodiment of record maintenance commands as sent by the radio broadcaster to the loader 46 regarding records data. Column 102 of the table 100 lists the login command items. Column 104 of the table 100 lists the login command bit length for the corresponding login command item from the login command item column 102. Column 106 of the table 100 lists the login value for the corresponding login item from the login command item column 102. Column 108 of the table 100 depicts remarks for the corresponding item from the login command item column 102. Row 110 of the table 100 shows that the item marker sent by the radio broadcaster, of bit length 4 and of a value of DATA, and received by the loader 46 marks the start of a new command. Row 112 of the table 100 shows that the item broadcaster ID sent by the radio broadcaster, of bit length 5, and received by the loader 46, presents the call letters identification of the particular radio station. Row 114 of the table 100 shows the item command type, of bit length 1, a value of 1, 2, or 3, and received by the loader 46, indicates whether to insert, update, or delete a record. Row 116 of the table 100 shows the item record ID, of bit length 10, sent by the radio broadcaster and received by the loader 46, indicates the record identifier set by the schedule loader program that is returned on an insert command request. Row 118 of the table 100 shows the item start date, of bit length 10, having a value of DATA (i.e. MM/DD/YYYY), sent by the radio broadcaster and received by the loader 46, provides a date for advertisement insertion. Row 120 of the table 100 shows the item time, of byte length 11, having a value of TIME (i.e. HH:MM:SS:SS), sent by the radio broadcaster and received by the loader 46, provides a time for advertisement insertion. Row 122 of the table 100 shows the item ad identifier, of bit length 20, sent by the radio broadcaster and received by the loader 46, provides a record identifier for advertisement media located on an advertisement server. Row 124 of the table 100 shows the item results, of bit length 1, having a value of 1 or 0, sent by the radio broadcaster and received by the loader 46, indicates whether the record has failed or passed. Row 126 of the table 100 shows the item marker, of bit length 3, having a value of DEND, sent by the broadcaster and received by the loader 46, indicates the end of the commands.

Advertisement staging is accomplished by the advertisement (ad) staging module 48 through appropriate software, hardware, or a combination of both. The advertisement staging 48 connects to an advertisement server 50 in order to obtain an advertisement for later insertion into the program content. The advertisement is cached in memory associated with the advertisement staging 48. Staging of the advertisements is driven by requests from the control thread. The control thread analyzes the schedule requirements, and notifies the ad staging 48 as to which advertisements are required for the next broadcast cycle so that the advertisement is ready at the required time. The advertisement is thus predictively staged. The advertisements are preferably cached since significant delays can occur when trying to retrieve an advertisement in real time, especially from Internet servers.

The system 30 includes an error processor to parse the composite datastream (i.e. radio station and advertisements) provided to the user 32 to detect errors. An error concealment function is operable to reduce the consequences of a detected error.

In accordance with an aspect of the present invention, the multiplexer 40 manages the connections with the users 32, switching between broadcast program and advertisement presentation for each pipeline or IP socket 52 (see FIG. 2). The multiplexer 40 can be configured to transport the broadcast to other nodes in the network that are running the present multiplexer program, i.e. scalability. This is depicted in FIG. 3.

Referring now to FIG. 3, there is depicted a block diagram illustrating the scalability of the present invention. It should be appreciated that the multiplexer 40 may be implemented in appropriate software, hardware, or a combination of software and hardware. In general, each box in FIG. 3 represents a processing thread that is managed within the multiplexer program. As discussed below, multiple multiplexer programs can be run on the same web server, or distributed across multiple servers. The determination of how this is configured is made optimally based on the capabilities of the web server and the operating system on which the multiplexer program is running. In FIG. 3, the multiplexer 40 is considered a main multiplexer, while the multiplexer 140 an auxiliary or supplemental multiplexer. The main multiplexer 40 is configured to support a content (radio broadcast and advertisements) multiplexer 150 that receives a radio broadcast, represented by the line labeled Broadcast, and advertisements, represented by the lines labeled Ad 1, Ad 2, and Ad 3 (targeted advertisements via the ad feeds of the ad staging module 43, see FIG. 2). It should be appreciated that the multiplexer labeled 40 in FIG. 2 supports the multiplexer architecture depicted in FIG. 3 and described below. Further, it should be appreciated that the present invention supports multiple auxiliary or supplemental multiplexers 140, even though only one such auxiliary or supplemental multiplexer 140 is shown in FIG. 3.

A connection request originates from the web server 36, which is the point of contact for users 32 that want to access a broadcast. The web server 36 attempts to connect to an active connection manager 152 of the plurality of connection managers represented by the multiple connection manager boxes. The active connection manager will change based on system load. The web server 36 is notified when the active connection manager changes. The connection manager 152 determines whether its server has adequate resources to support another user 32. If the connection manager 152 does have adequate resources to support another user 32, the connection manager 152 returns an IP address and port id to the web server, and a listener broadcast thread 154 (LBT) is started. The LBT waits for a connection to occur on the IP address and port id. When a connection occurs, the LBT streams the broadcast/add data it finds on the assigned input channel. The input channel is implemented as a memory queue that is created by the content multiplexer 150 or a repeater 156.

If the local machine does not have adequate resources to start an LBT, then the connection manager 152 passes the connection request to the next multiplexer (the auxiliary or supplemental multiplexer 140) in the configuration. If no multiplexers can support the request, the user is denied access. When the LBT is started, the web server 36 downloads a dynamic Java applet (or equivalent command instruction) to the web client which will then open a connection to the IP address and port received from the connection request. The Java applet will then start an MP3 (or other music decoder) player installed on the user's computer.

The content multiplexer 150 manages queue pointers that are used by the LBTs to select their MP3 data source. During the program broadcast, all LBTs are pointing at the same queue that contains the radio program. When the multiplexer 40 receives the advertisement start buffer, the multiplexer 40 resets the input pointers for the LBTs such that they receive data from the appropriate advertisement source. The content multiplexer 150 then resets a primary broadcast queue pointer to the appropriate buffer in the source broadcast by looking for the timestamp on the buffer that is closest to the advertisement start time plus the length of the advertisement (per the schedule). This resynchronizes the user 32 back to the appropriate start point in the broadcast.

The repeaters 156 on the main multiplexer 40 acts like a listener broadcast thread, except that instead of sending the stream to a listener, the stream is sent to a repeater 256 on another machine (multiplexer 140). The repeater 256 on the multiplexer 140 creates a memory queue that is transparently mapped to the LBTs. A repeater thread instance for every demographic type and every machine node in the network will be configured on the main multiplexer 40 instance. A repeater thread is started for every active demographic type on supporting nodes in the network as connection requests require.

The present connection manager architecture as described above provides for scalability of system throughput because each user requesting connection to a broadcast can be allocated computing resources on a machine in the network where resources are available. As servers (processors and the like) are added to the configuration, the number of users that can be supported increases in direct proportion to the added hardware.

The present repeater architecture provides for the addition of servers in the network to support additional users without linearly increasing the demand on the network. This is accomplished by transmitting the aggregated program content for a specific demographic type to a server which, in turn, will transmit the broadcast to any number of listeners of that demographic type.

Each demographically aggregated program requires roughly 130 kbs of network bandwidth to maintain the broadcast quality. Around 750 unique program streams are supportable on a 100 baseT network. In practice, this is far greater than the likely number of unique advertisements per timeslice. As such, connecting multiple machines (in order to scale processing power for LBTs) does not present load challenges on the network A significant bottleneck may occur between the LBT and a network switch/router switch associated with the server to the Internet. If a given machine in the network were supporting 4000 listener connections, the output data stream bandwidth requires 500 Mbs of throughput. This bandwidth issue is easily solved, however, with currently available router and switching technology.

The point to point and steady stream nature of each connection to a user 32 allows for a server configuration that includes multiple network connections between a given server and a network router. Each network connection to the router is preferably on a dedicated physical link, so that all network capacity on the link is allocated to a set of LBTs.

A router/switch supports multiple connections to allow scaling of the load across the physical links. Current network router technology can operate at throughput rates of 1 Gpbs, so a router handles up to 10 (ten)100 baseT links. The router will preferably switch the load to the Internet via optical (e.g. SONET), DS4, or other interfaces. With optical network switching operating at 2.4 Gbs per channel, and DS4 at 254 Mbs, a solution simply requires configuring an adequate number of DS4/optical channels to enough routers to support the intended number of simultaneous listener connections.

Scalability is thus an aspect of the present invention since the viability of personalized broadcast as a business model requires reaching large numbers of people. Accomplishing this mandates a system architecture that can distribute the workload across multiple computers/servers.

The present architecture represents one important aspect of the present invention. The present design allows for a highly scaleable architecture to support thousands of users simultaneously while maintaining a high quality of service. As well, the present architecture addresses a central problem of individualized broadcast: of being able to support a unique stream of broadcast in a point to point network, which is the nature of the Internet.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for processing broadcast multimedia program content and advertisements to provide a plurality of program datastreams having multimedia data content and user targeted advertisements to multiple different users, comprising:
    a processor that receives multiple broadcast sources to concurrently provide broadcast multimedia program content to the system, said broadcast multimedia program content comprises at least one of (a) streamed audio data, (b) streamed video data, and (c) a radio or video broadcast;

a scheduler to schedule time of insertion of a designated advertisement into selected broadcast multimedia program content in response to advertising schedule information received from a broadcaster representing a source from said multiple broadcast sources, an advertisement stager which uses said schedule information to stage advertisements for insertion during a next broadcast cycle as determined by said schedule information at a scheduled insertion time determined by said scheduler information;

a multiplexer operable to provide multiple users with individualized composite program datastream by performing in parallel for multiple users;

insertion of said designated advertisement from said advertisement stager into a selected multimedia program content at a scheduled insertion time determined from said scheduler information to form a composite program datastream; and coupling of said composite program datastream to a corresponding user of the multiple users.

2. The system of claim 1, wherein:
said scheduler schedules insertion of said designated advertisement into said multimedia program content based on at least one of (a) scheduling information provided by a broadcast source of said selected broadcast multimedia program, and (b) scheduling information provided by a source of said designated advertisement.

3. The system of claim 2, wherein:
said scheduling information contains advertisement scheduling information covering multiple broadcast multimedia programs.

4. The system of claim 2, wherein:
said scheduling information provided by a broadcast source comprises at least one of (a) information indicating time slots available for advertisement insertion in said broadcast multimedia program, (b) markers in said selected broadcast multimedia program indicating an advertisement insertion time slot, and (c) information for identifying advertisement insertion time slots from time stamp indications.

5. The system of claim 1, wherein:
said multiplexer repeats said composite program datastream by mapping stored data comprising said composite program datastream to provide multiple stored copies of said composite program datastream for coupling to multiple users to enable scalable expansion of broadcast of said composite program datastream.

6. The system of claim 1, wherein:
said multiplexer tracks a user connection and maintains a database of user connection related statistics comprising at least one of (a) user favorite program sources, (b) number of advertisements broadcast, (c) number of users receiving said composite program datastream, and (d) length of user connection to a particular composite program datastream.

7. The system of claim 1, wherein:
said multiplexer dynamically reallocates advertisements targeted to a user during broadcast of said composite program datastream in response to a command by selecting an advertisement from a plurality of available advertisements of duration suitable for a time slot at said scheduled insertion time.

8. The system of claim 7, wherein:
a locally sourced advertisement is selected for said time slot in preference to a non-locally sourced advertisement.

9. The system of claim 8, further comprising:
an error processor operable to parse said composite program datastream to detect error, and including an error concealment function operable to reduce the consequences of a detected error.

10. The system of claim 1, further comprising:
a user profile database operable to allocate one of a plurality of available different advertisements for a delivery to an individual user based on previously compiled user preference data in said user profile database; and a data acquisition processor operable to compile user preference information used in said user profile database based on prior user program selection history.

11. The system of claim 1 additionally comprising a conditional access processor to determine the authorization of multiple broadcast sources and, said conditional access processor determines authorization of a broadcast source to provide broadcast multimedia program content based on a broadcaster ID which is transmitted by a broadcast source.

12. The system of claim 11, wherein said conditional access processor permits said broadcast source to be broadcasted to said multiple users by decrypting a program stream from said broadcaster for broadcast and prevents said program stream from being broadcasted to said multiple users in view of a validation routine that considers the time of a broadcast.

13. The system of claim 1 additionally comprising a conditional access processor to determine the authorization of multiple broadcast sources and, said conditional access processor includes a decryption function to decrypt at least one of (a) encrypted broadcast multimedia program content, and (b) an encrypted authorization code or password.

14. The system of claim 1, wherein:
said multiplexer repeats said composite program datastream by mapping stored data comprising said composite program datastream to provide multiple stored copies of said composite program datastream for coupling to multiple users to enable scaleable expansion of broadcast of said composite program datastream.

\* \* \* \* \*